United States Patent
Weining et al.

(10) Patent No.: US 6,325,056 B1
(45) Date of Patent: Dec. 4, 2001

(54) OPERATING METHOD FOR AN INTERNAL COMBUSTION ENGINE WITH LAMBDA-VALUE CONTROL

(75) Inventors: Hans-Karl Weining, Esslingen; Gottfried Wollenhaupt, Stuttgart, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/490,823

(22) Filed: Jan. 25, 2000

(30) Foreign Application Priority Data

Jan. 30, 1999 (DE) .............................................. 199 03 721

(51) Int. Cl.$^7$ .................................................. F02D 41/14
(52) U.S. Cl. ........................ 123/673; 123/443; 123/692; 123/696
(58) Field of Search .................................... 123/443, 673, 123/691, 692, 696

(56) References Cited

U.S. PATENT DOCUMENTS

| | | | |
|---|---|---|---|
| 5,131,372 | * 7/1992 | Nakaniwa | 123/673 |
| 5,657,736 | 8/1997 | Maki et al. | 123/673 |
| 5,755,094 | 5/1998 | Maki et al. | 60/276 |
| 5,911,682 | * 6/1999 | Kato et al. | 123/673 X |
| 5,983,874 | 11/1999 | Suzuki et al. | 123/673 |

FOREIGN PATENT DOCUMENTS

| | | |
|---|---|---|
| 3620775 | 1/1987 | (DE) . |
| 3633671 | 4/1988 | (DE) . |
| 4310145 | 4/1994 | (DE) . |
| 3500594 | 8/1995 | (DE) . |
| 60-209657 | * 10/1985 | (JP) . |

* cited by examiner

Primary Examiner—Tony M. Argenbright
(74) Attorney, Agent, or Firm—Crowell & Moring LLP

(57) ABSTRACT

The invention relates to a method for the cylinder-selective control of an air/fuel mixture to be burnt in a multi-cylinder internal combustion engine, in which the lambda values for different cylinders or groups of cylinders are separately sensed and controlled, and also relates to a multi-cylinder internal engine suitable for carrying out the method. In accordance with the invention, the lambda values of the individual cylinders or groups of cylinders are simultaneously controlled to different required values using an integrating I-control proportion with variable integrator slope and/or a differentiating D-control proportion.

6 Claims, 5 Drawing Sheets

OPERATING METHOD FOR AN INTERNAL COMBUSTION ENGINE WITH LAMBDA-VALUE CONTROL

The invention relates to a method for the cylinder-selective control of an air/fuel mixture to be burnt in a multi-cylinder internal combustion engine, in which method the lambda values for different cylinders or groups of cylinders are sensed and controlled separately, and the invention also relates to a multi-cylinder internal combustion engine which is suitable for carrying out the operating method.

A multi-cylinder internal combustion engine in which there is a lambda probe in an exhaust duct, through which exhaust gases are jointly removed from all cylinders, is described in DE 36 20 775 A1. The lambda probe measurements are evaluated in a cylinder-selective manner, i.e. one individually associated with the cylinders of the internal combustion engine, by means of a selector unit. In this way, it is possible to draw conclusions on the composition of the air/fuel mixture burnt during the respective working stroke in each cylinder. In addition, control stages—by means of which the composition of the air/fuel mixture is controlled to a common, specified required value for each cylinder individually—are associated with the cylinders.

A method of injecting fuel is known, from DE 36 33 671 A1, in which the output signal of an exhaust gas probe arranged in an exhaust gas duct is evaluated sequentially. The value of the exhaust gas probe signal respectively occurring during a time segment is then used to control an injection quantity at that injection valve which is associated with the cylinder to whose exhaust gases the exhaust gas probe is subjected in the respective time segment. The control takes place in such a way that fuel metering, which is as uniform as possible, is provided for the individual cylinders.

DE 43 10 145 A1 reveals a multi-cylinder internal combustion engine in which a correction of the fuel injection quantity takes place during the mixture formation procedure on the basis of measurements from at least one lambda probe, which is located in a common exhaust gas duct of the cylinders. In this arrangement, provision is made to supply one group of cylinders with a weak air/fuel mixture and another group of cylinders with a rich air/fuel mixture during idling or part-load operation. The object of this is to heat a catalyser located in the exhaust gas duct rapidly to operating temperature by means of subsequent exothermal reactions taking place in it.

SUMMARY OF THE INVENTION

The object of the invention is to provide a method for the cylinder-selective control of an air/fuel mixture, of the type mentioned at the beginning, to be burnt in a multi-cylinder internal combustion engine and to create an internal combustion engine suitable for carrying out the method, which make it possible to operate the internal combustion engine with comparatively accurately controlled and adjustable exhaust gas composition in a novel, advantageous manner.

This object is achieved by means of an operating method for a multi-cylinder internal combustion engine. In the operating method the lambda values of the individual cylinders or cylinder groups are simultaneously controlled to different required values with the use of an integrating I-control proportion with variable integrator slope and/or a differentiating D-control proportion. In accordance with another aspect of the invention, a control device with a plurality of parallel controller units for the separate control of the lambda values for different cylinders or cylinder groups by means of corresponding activation of a mixture formation appliance associated with each cylinder and one or a plurality of lambda probes is provided for sensing the lambda values for the different cylinders or cylinder groups, the control units being equipped for the simultaneous adjustment of different required lambda values for the different cylinders or cylinder groups and having an I-controller component with variable integrator slope and/or a D-controller component.

In this way, the air/fuel ratio for each cylinder or each group of cylinders can be controlled individually to an arbitrary individually required lambda value and, if required, to one which alternates rapidly with time without high control amplitudes appearing. By this means, the thermal load on a catalyser arranged in the exhaust gas ducting system can be adjusted and, if appropriate, reduced in a controlled manner. The quantity of rich and weak exhaust gas emissions following one another in sequence can be adjusted in a controlled manner with low control amplitudes. If required, these exhaust gas emissions can produce exothermal reactions in the catalyser and therefore heating of it.

In a further development, of the method for cylinder-selective control of an air/fuel mixture to be burnt, in appropriately spread rich/weak operating phases, the required lambda values for a first subgroup of the cylinders are selected in the rich range and they are selected for the residual second subgroup of the cylinders in the weak range, and the distance between the two required lambda values is varied as a function of the engine operation.

In a further development, of the method, in corresponding operating phases, the required lambda value is selected, for individual cylinders or for a plurality or cylinders combined in one group, alternately in the rich range and the weak range from working cycle to working cycle. This creates a method in which the control parameters can be easily adjusted and which permits smooth running of the internal combustion engine.

In a further development, of the method, the lambda value of a particular cylinder or a particular group of cylinders is measured with a proportional lambda probe and the integrator slope of an associated lambda-value control unit with I-controller component is adjusted as a function of the control deviation of the measured lambda value from the associated required value. This further improves the flexibility of the control method with the objective of an optimum exhaust gas composition in the catalyser.

In a further development, of the method, the control of the particular lambda value includes an adjustment of the mixture composition, for a respectively next working cycle of the relevant cylinder or the relevant group of cylinders, as a function of the lambda value already measured in the previous working cycle. This creates an individual combustion control method which can react rapidly to changing operating parameters of the internal combustion engine.

A multi-cylinder internal combustion engine further developed in accordance with the principles of the invention includes a lambda probe configured as a proportional measurement probe, and the respective control unit has an I-controller component with variably adjustable integrator slope as a function of the associated lambda value control deviation. The proportionally measuring lambda probe, which has a measurement behaviour which is in principle linear even if it is not absolutely mathematically accurately linear, permits the adjustment of required lambda values deviating specifically from the stoichiometric value of unity.

A variable integrator slope permits the rapid reduction of control deviations which appear. A high level of flexibility of the control device for the multi-cylinder internal combustion engine is achieved in this way, by means of which very precise individual combustion control is possible for each cylinder or each group of cylinders.

BRIEF DESCRIPTION OF THE DRAWINGS

Advantageous embodiment examples of the invention are represented in the drawings and are described below. In the drawings.

DETAILED DESCRIPTION

Figure 1:
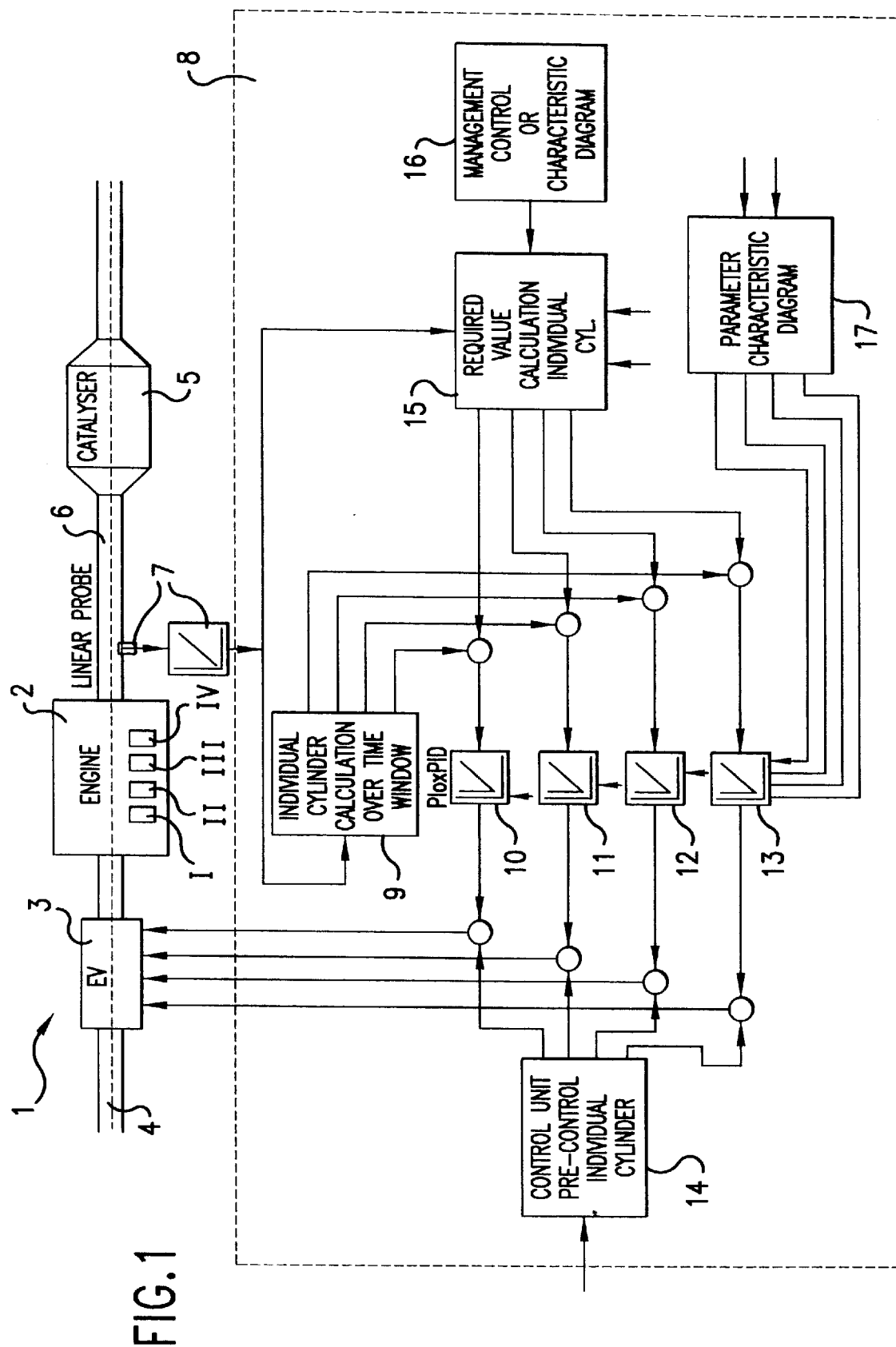
FIG. 1 shows a block circuit diagram of a first embodiment example of a multi-cylinder internal combustion engine with lambda-value control device and catalyser.

The internal combustion engine 1 represented in FIG. 1 is configured as a four-stroke cylinder engine and has an engine block 2, into whose cylinders I, II, III and IV fuel is injected by means of an injection appliance 3, acting as a mixture formation appliance, and, together with fresh air drawn from intake trunking 4, is burnt in the cylinders to generate drive energy. The exhaust combustion gases produced in the process are cleaned in a catalyser 5 and released to the environment. A lambda probe 7, which is configured as a linear or proportional measurement probe and by means of which the oxygen content of the exhaust combustion gas (and therefore the exhaust gas composition) is measured, is arranged in an exhaust gas duct 6 between the engine block 2 and the catalyser 5. The output signal of the lambda probe 7 is supplied to a control device 8, which activates the injection appliance 3 in a cylinder-selective manner on the basis of the measured exhaust gas composition, while taking account of engine operating parameters, it being possible to establish the composition of the air/fuel mixture to be burnt individually for each cylinder.

For this purpose, the control device 8 has a probe evaluation unit 9 in which an evaluation of the exhaust gas probe signal, resolved with respect to time, takes place. By this means, a cylinder-selective lambda value is determined for each cylinder of the internal combustion engine 1. A control unit 10, 11, 12 or 13 is associated with each cylinder of the internal combustion engine 1 in the control device 8 and this control unit, in association with an individual cylinder pre-control unit 14, which takes account of an air mass flow value supplied to it, establishes, for the associated cylinder, the respective injection procedure executed by means of the injection appliance 3. In addition, the control device 8 includes a required value specification unit 15, which specifies required values individually for the control units 10, 11, 12 and 13 of the control device 8 and upstream of which is connected a management unit 16. The management unit 16 controls the required value specification unit 15 on the basis of recorded operating parameters of the internal combustion engine 1, such as the temperature of the catalyser 5. As an alternative to this or in combination with it, it is also possible to control the required value specification unit 15 by means of a management unit in which a characteristic diagram is permanently included and to which is supplied the rotational speed of the internal combustion engine 1 and/or its drive load. A calculation of the required value for the lambda value of each individual cylinder of the internal combustion engine then takes place in the required value specification unit 15 on the basis of recorded measurements from the lambda probe 7. Here again, operating parameters of the internal combustion engine 1, such as the rotational speed, the drive shaft torque or the cooling water temperature, are taken into account. The control units 10, 11, 12 and 13 are configured as PI or, alternatively, as PID controllers. The parametric arrangement of the control units 10, 11, 12 and 13 takes place by means of a parameter specification unit 17, which establishes the parameters for the control units 10, 11, 12 and 13, such for example as proportional coefficient, reset time and lead time, on the basis of a characteristic diagram, while taking account of operating parameters of the internal combustion engine 1.

Such a control device makes it possible to achieve a resultant exhaust gas composition which supports environmentally-friendly operation of the internal combustion engine. It is, for example, possible to deliberately supply the catalyser 5 with exhaust gases which are produced by the combustion of simultaneously controlled rich and weak cylinder charges. The mingling of rich and weak exhaust gas mixtures causes subsequent exothermal reactions in the catalyser 5. This raises the temperature of the catalyser 5 and it can, in this way, be operated within temperature ranges favourable to its performance. This, for example, even makes it possible to operate the catalyser 5 in an environmentally-friendly manner directly after a cold start of the internal combustion engine 1. On the other hand, the formation of subsequent reactions in the catalyser 5 can be inhibited by limiting the control amplitude, which in turn permits a reduction in the catalyser temperature.

Figure 2:
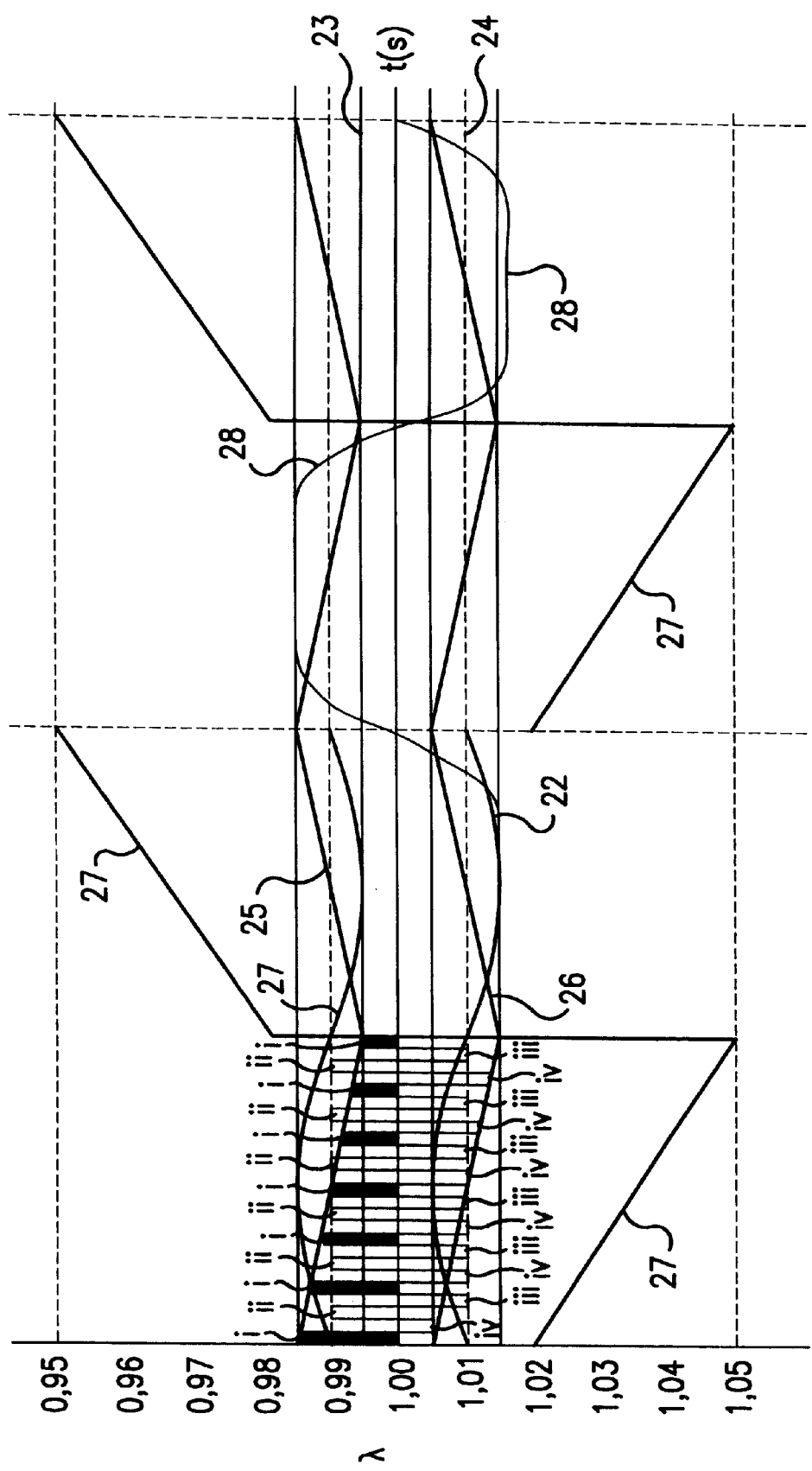
FIGS. 2 and 3 show diagrams for explaining special lambda-value controls of the internal combustion engine represented in FIG. 1.

FIG. 2 explains, in an x-y diagram, a possible variation with time of the exhaust gas composition, subdivided by cylinders, such as can be achieved with an internal combustion engine 1, as illustrated in FIG. 1, in the example with continuous control. The lambda value recorded by the lambda probe 7 is plotted on the y-axis as a measure of the exhaust gas composition; the x-axis forms the time axis. An injection procedure for the respective cylinders I, II, III and IV of FIG. 1 is indicated by means of the Roman numerals i to iv. The mixture composition of the air/fuel mixture to be burnt is controlled to different required values for the cylinders I, II, III and IV. For the cylinder I, the mixture composition is varied within the rich range, the mixture composition for the cylinder II is kept constant within the rich range, the mixture composition for the cylinder III is adjusted to a constant, weak value and the mixture composition for the cylinder IV is controlled to varied required values within the weak range.

The sinusoidally varying curve 21 represents the exhaust gas composition for the cylinder I as sensed by the lambda probe 7. The sinusoidally varying curve 22 illustrates the exhaust gas composition for the cylinder IV, likewise recorded by means of the lambda probe 7. The interrupted lines 23 and 24 represent the average value for the exhaust gas composition from the cylinders II and III, respectively. The curves 25 and 26 correspond to the variation with time of the setting parameters for the control units associated with the cylinders I and III, respectively. The slope of the curves 25 and 26 is determined by the integrator slope value of the I-proportion of the associated control units. The individual exhaust gas compositions of the cylinders I, II, III and IV are located, as an example in this arrangement, within a lambda value range between λ=0.985 and λ=1.015. The variation with time of a setting parameter for the mixture composition of all the cylinders of an engine, which is obtained in the case of a conventional control system without cylinder-selective evaluation, is represented for comparison purposes by means of the curve 27. The curve 28 shows the exhaust gas composition sensed by the lambda probe in such a case. It may be seen that, compared with the control strategy using cylinder-selective evaluation of the lambda probe signal, markedly larger amplitude fluctuations in the exhaust gas composition occur in the case of the conventional control system, in consequence of which higher subsequent reaction temperatures in the catalyser also occur.

Figure 3:
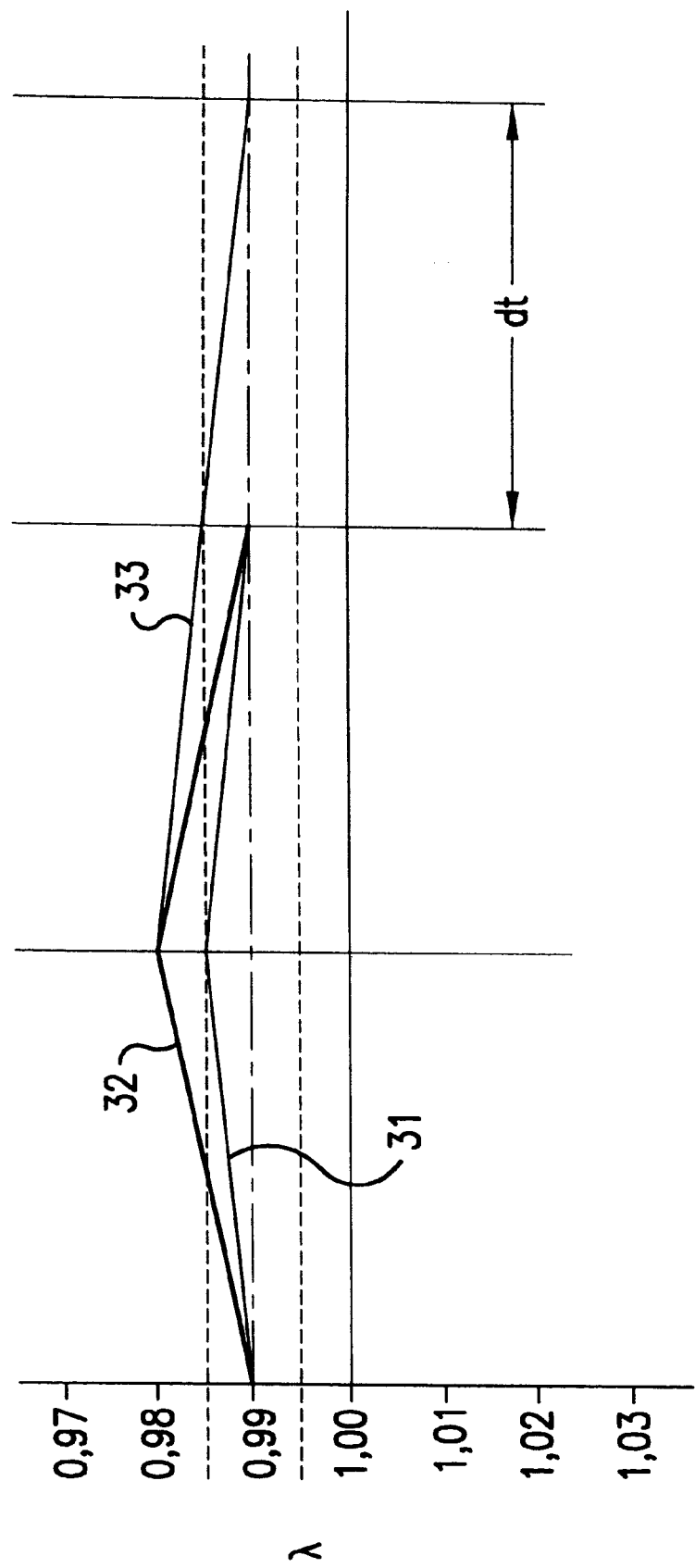

FIG. 3 explains a further control strategy, which can be employed in the internal combustion engine represented in FIG. 1 and which is based on a variation of the integrator slope of the I-controller proportion. In FIG. 3, the curves 31, 32 and 33 represent the variation of the lambda value of the mixture composition adjusted by a respective control unit for different required value specifications or different values for the setting time of the I-proportion of a respective controller, i.e. for its integrator slope. The curve 31 represents a first example of a controller setting-signal variation. In contrast, the curve 32 shows an example with initially more strongly rising controller deviation. If the integrator slope in accordance with the curve 31 should now also be retained unaltered in this case, the control deviation from the required value of 0.99 to, for example, 0.98 could only be controlled out relatively slowly, as is represented by the curve 33. By means of the alteration of the integrator slope undertaken as a function of the control deviation, especially the selection of a slope magnitude increasing with higher control difference magnitude, this control deviation can, in contrast, be controlled out, in the present control example corresponding to the curve 32, more rapidly—with a time gain of dt.

Figure 4:
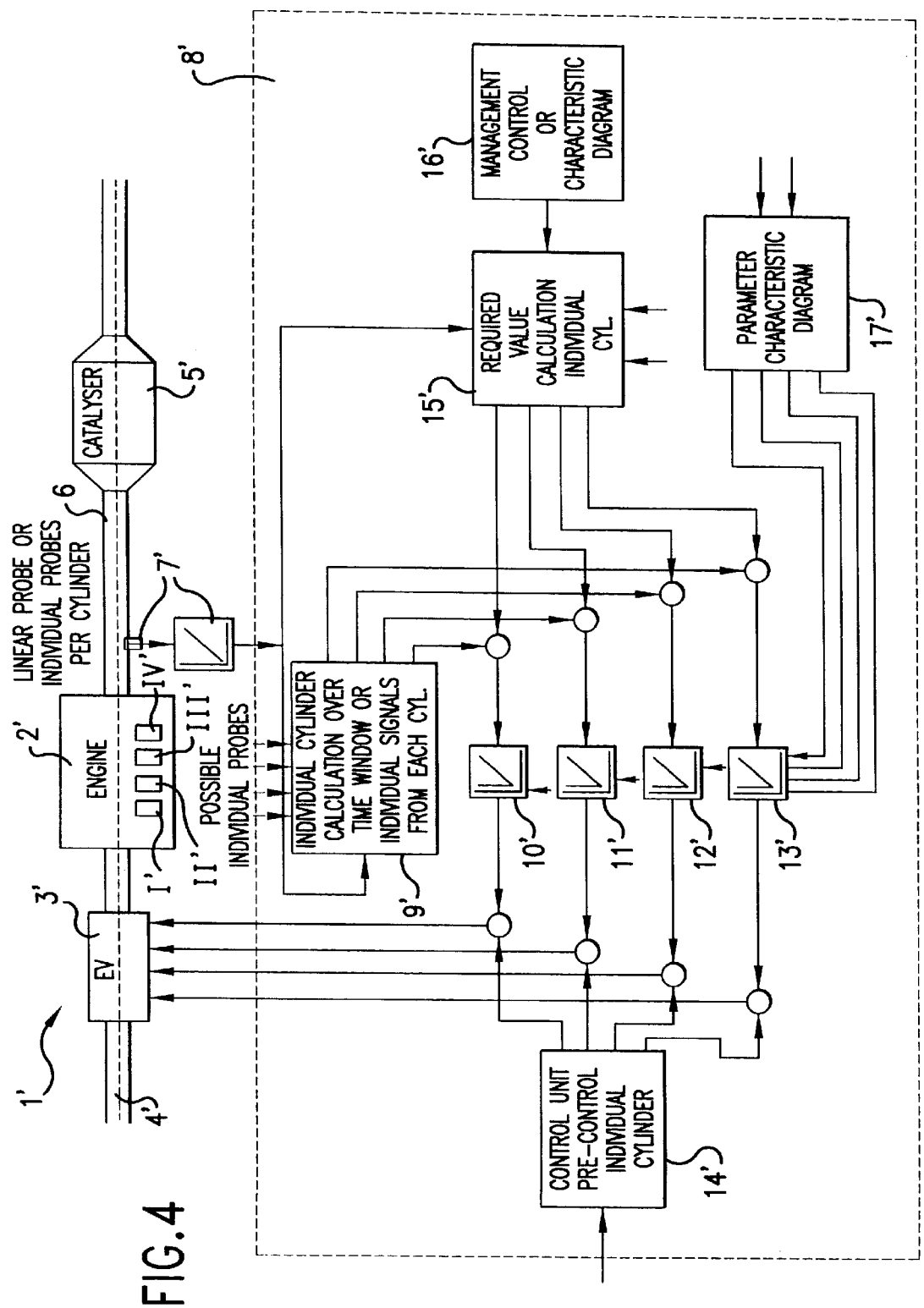
FIG. 4 shows a block circuit diagram of a second embodiment example of a multi-cylinder internal combustion engine with lambda-value control device and FIGS. 5 and 6 show diagrams for explaining the mode of operation of the internal combustion engine represented in FIG. 4.

FIG. 4 shows a further embodiment example of an internal combustion engine with control device for controlling the composition of an air/fuel mixture to be burnt. Subassemblies whose function corresponds to equivalent subassemblies in FIG. 1 have mutually corresponding designation signs but ones provided with a prime. The internal combustion engine 1' represented in FIG. 4 has controllers 10', 11', 12' and 13', which are associated with the individual cylinders and are configured as PD controllers. In association with a sufficiently rapidly responding lambda sensor system, for example a linear probe or individual probes for each cylinder with a time resolution capability in the millisecond range, this permits high-level control dynamics for the injection appliance 3', acting as the mixture-formation appliance, and therefore individual combustion control, i.e. changes to the actual value of the exhaust gas composition of a working cycle can already have been taken into account for the next working cycle. This creates the possibility of specifically controlling each individual combustion process in each of the cylinders I', II', III' and IV'.

The four-stroke internal combustion engine 1' represented in FIG. 4 permits the adjustment of the injection procedure over the complete duration of the induction stroke on the basis of the composition of the expelled combustion gas recorded in the directly preceding exhaust stroke. The time taken for the gas from the cylinders I', II', III' and IV' to travel to the exhaust gas probe 7' is then taken into account in the internal combustion engine 1' and the corresponding setting parameter for the injection appliance 3' of the cylinders is then calculated, an instantaneous injection procedure being corrected as a function of the combustion process immediately preceding it.

Figure 5:
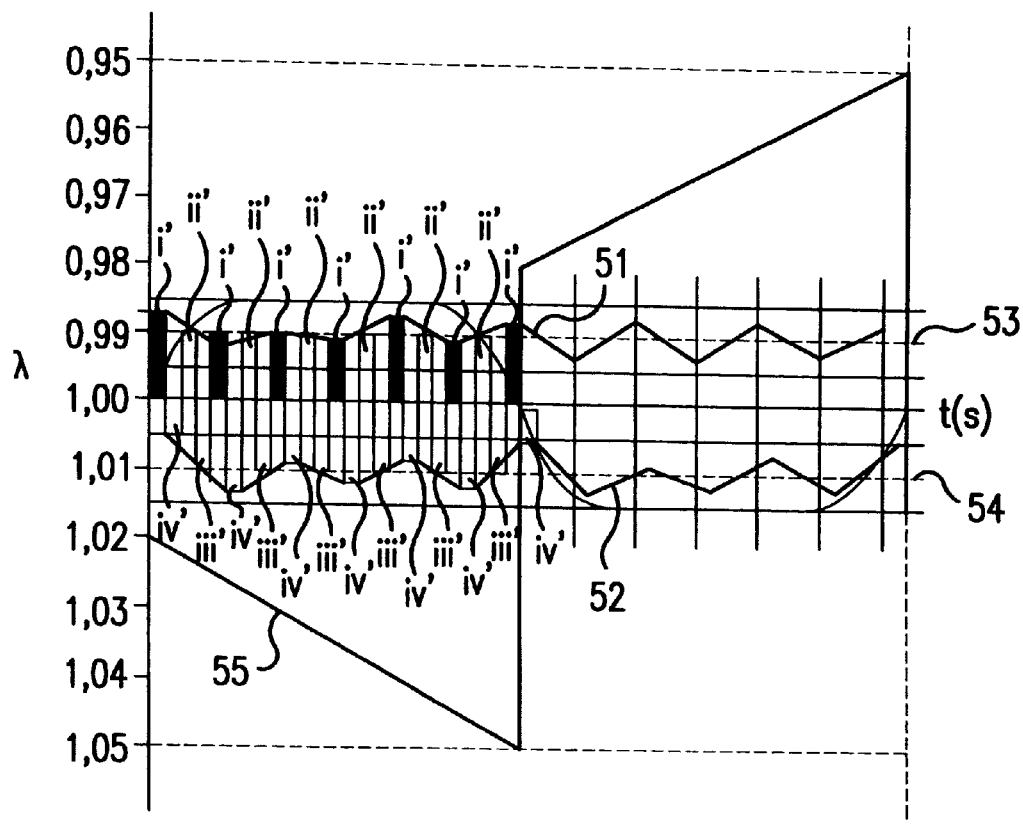

FIG. 5 explains, in an x-y diagram corresponding to FIG. 2, a possible control variation with time of the exhaust gas composition, such as can be achieved by means of the internal combustion engine 1' and the associated control device 8' of FIG. 4. The instantaneous lambda value is plotted on the y-axis as a measure of the exhaust gas composition; the x-axis again represents a time axis. As in FIG. 2, the injection procedure in the cylinders I', II', III' and IV' is indicated by the designation signs i', ii', iii' and iv'. In this arrangement, the mixture composition for the cylinders II' and III' is kept constant, whereas the mixture composition for the cylinders I' and IV' is varied for each working cycle, within the rich or weak range, as shown by the curves 51 and 52. The average value for the mixture composition of the cylinders I' and IV' then coincides with the interrupted straight lines 53 and 54. A resultant exhaust gas composition of λ=1.0 is therefore achieved. As in the case of FIG. 2, the fluctuation width for the composition of the exhaust gas from the respective cylinders, i.e. the control amplitude, is markedly less as compared with a conventional, non-cylinder-selective, slow lambda-value control, which takes place, for example, as shown by the control curve provided with the designation sign 55.

Figure 6:
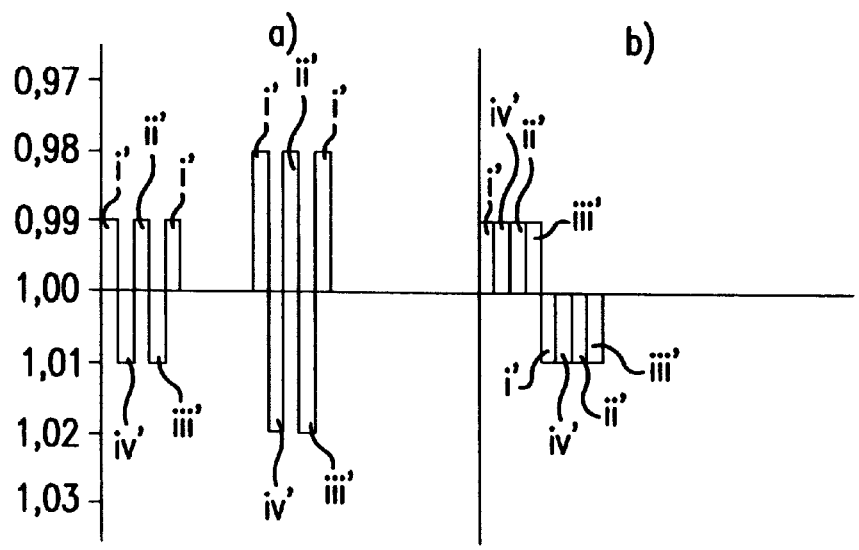

Alternative control strategies, such as are made possible by the internal combustion engine 1' of FIG. 4, are represented in FIGS. 6a and 6b. The injection procedures in the cylinders I' to IV' are again indicated by the designation signs i' to iv'. In accordance with the control strategy of FIG. 6a, the control amplitude for the mixture composition is, for example, varied as a function of engine operating parameters by changing a rich/weak spread, i.e. the difference between the required lambda values for cylinders operated weak, on the one hand, and cylinders operated rich, on the other, so that the thermal load on the catalyser 5' can be influenced by this means. If the temperature of the catalyser 5' is also measured in the internal combustion engine 1' represented in FIG. 4, it is possible to control to the desired catalyser temperature by means of appropriate rich/weak spread. In the internal combustion engine 1' of FIG. 4, control corresponding to the exhaust gas temperature model (ATM) can take place for this purpose by means of the management control unit 16' or the parameter characteristic field unit 17'. The specification of cylinder-selective required values for the exhaust gas composition, and in particular for the control strategy of the rich/weak spread, again permits the rapid approach to a favourable catalyser operating temperature. In the case of a control of the mixture composition in accordance with FIG. 6d, a certain number of cylinders are combined to form rich or weak groups which are operated alternately in the rich or weak mixture range from working cycle to working cycle. The thermal load on the catalyser can, in this way, be likewise adjusted or controlled.

What is claimed is:
1. Method for the cylinder-selective control of an air/fuel mixture to be burnt in a multi-cylinder internal combustion engine, in which the lambda values for different cylinders or groups of cylinders are separately sensed and controlled, characterized in that the lambda values of the individual cylinders or groups of cylinders are simultaneously controlled to different required values using at least one of an integrating I-control proportion with variable integrator slope and a differentiating D-control proportion.

2. Method according to claim 1, characterized in that, in corresponding operating phases, the required lambda value is selected, for individual cylinders or for a plurality of cylinders combined in one group, alternately in the rich range and the weak range from working cycle to working cycle.

3. Method according to claim 1, characterized in that the lambda value of a particular cylinder or a particular group of cylinders is measured with a proportional lambda probe and an integrator slope of an associated lambda-value control unit with I-control component is adjusted as a function of a control deviation of the measured lambda value from the associated required value.

4. Method according to claim 1, characterized in that the control of the particular lambda value includes an adjustment of the mixture composition, for a respectively next working cycle of the relevant cylinder or the relevant group of cylinders, as a function of the lambda value measured in a previous working cycle.

5. Multi-cylinder internal combustion engine, having
   a control device with a plurality of parallel control units for separate control of lambda values for different cylinders or groups of cylinders by corresponding activation of a mixture formation appliance associated with each cylinder and
   at least one lambda probe for sensing the lambda values for the different cylinders or groups of cylinders,
   characterized in that the control units are equipped for simultaneous adjustment of different required lambda values for the different cylinders or groups of cylinders and have at least one of an I-controller component with variable integrator slope and a D-controller component.

6. Multi-cylinder internal combustion engine according to claim 5, characterized in that
   the at least one lambda probe is a proportional measurement probe and
   the respective controller unit has an I-controller component with integrator slope which can be variably adjusted as a function of associated lambda-value control deviation.

* * * * *